(12) United States Patent
Harris et al.

(10) Patent No.: US 6,602,948 B2
(45) Date of Patent: Aug. 5, 2003

(54) METHOD OF REDUCING SYNERESIS IN AQUEOUS COMPOSITIONS

(76) Inventors: Jerome M. Harris, 1101 Townshipline Rd., Penllyn, PA (US) 19422; James W. Neely, 504 Martin La., Dresher, PA (US) 19025

( * ) Notice: Subject to any disclaimer, the term of this patent is extended or adjusted under 35 U.S.C. 154(b) by 17 days.

(21) Appl. No.: 09/867,960

(22) Filed: May 30, 2001

(65) Prior Publication Data

US 2002/0010255 A1 Jan. 24, 2002

Related U.S. Application Data

(60) Provisional application No. 60/212,561, filed on Jun. 20, 2000.

(51) Int. Cl.[7] .............................. C08J 3/00; C08K 3/20; C08L 75/00
(52) U.S. Cl. ...................... 524/589; 524/507; 524/590; 524/591; 524/839; 524/840
(58) Field of Search ................................. 524/591, 839, 524/840, 507, 589, 590

(56) References Cited

U.S. PATENT DOCUMENTS

| | | | |
|---|---|---|---|
| 3,770,684 A | 11/1973 | Singer et al. | 260/29.7 |
| 3,998,973 A | 12/1976 | Carlson | |
| 4,079,028 A | 3/1978 | Emmons et al. | 260/29.6 |
| 4,096,327 A | 6/1978 | Guiseley | |
| 4,298,511 A | 11/1981 | Schimmel et al. | 260/29.2 |
| 4,327,008 A | 4/1982 | Schimmel et al. | 524/104 |
| 4,426,485 A | 1/1984 | Hoy et al. | 524/591 |
| 4,499,233 A | 2/1985 | Tetenbaum et al. | 524/591 |
| 5,281,654 A | 1/1994 | Eisenhart et al. | 524/500 |
| 5,496,908 A | 3/1996 | Bostrom et al. | 528/74.5 |
| 5,973,053 A | 10/1999 | Usuki et al. | 524/591 |
| 6,011,106 A | 1/2000 | De La Cuesta Sheppard | |
| 6,337,366 B1 * | 1/2002 | Amick et al. | |

OTHER PUBLICATIONS

European Search Report, Application #EP 01 30 5132.

* cited by examiner

*Primary Examiner*—Patrick D. Niland

(57) ABSTRACT

A method for reducing or eliminating syneresis in an aqueous latex composition caused by the flocculation of the latex particles as a result of interaction with hydrophobically modified ethylene oxide based urethane rheology modifiers. The method of the invention involves adding to the aqueous latex composition a molecule containing a single hydrophobic moiety which has a poly-ethylene oxide backbone chain-length of greater than about 5000 Mn. The method of the present invention also increases the viscosity efficiency of the aqueous latex composition by combining a multiphobe with a monophobe.

10 Claims, No Drawings

METHOD OF REDUCING SYNERESIS IN AQUEOUS COMPOSITIONS

CROSS REFERENCE TO RELATED PATENT APPLICATIONS

This is a non-provisional application of prior pending U.S. provisional application Ser. No. 60/212,561 filed Jun. 20, 2000.

The present invention relates to a method of reducing syneresis in certain aqueous compositions while, at the same time, increasing the viscosity efficiency of the aqueous system. The method of this invention is particularly applicable to aqueous compositions which contain latex polymers and thickening agents.

Since aqueous based compositions were first introduced, additives have been sought to increase the viscosity and to maintain the viscosity at desired levels under various processing conditions and end use situations. These additives are commonly referred to as "thickening agents" or "thickeners". Thickeners are used in latex paints for viscosity improvement and control as well as for protective colloidal action and for the improvement of pigment suspension, leveling and flow. In addition, the additives often emulsify, disperse and stabilize latex ingredients. In latex paints and textile treating compositions, thickeners often improve the "sticking" or binding properties of the overall composition. Thickeners are commonly used in the cosmetic industry as thixotropic agents and to improve softening, sizing and handling properties. As additives to paper coating compositions, thickeners improve thickening under high shear conditions. Thickeners are likewise useful for the foregoing and other properties in oil well drilling and flooding fluids, fire-fighting foams and fluids, detergents, leather pastes and finishes, adhesives, pharmaceuticals, agricultural formulations and emulsions of all types.

Among the many well-known thickeners are natural products such as the alginates, casein, gum karaya, locust bean gum and gum tragacanth, and modified natural products such as the cellulosics, including methyl cellulose, hydroxyethyl cellulose and hydroxypropyl cellulose.

Many synthetic thickeners are also available, such as carboxy vinyl ether copolymers, acrylic polymers and maleic anhydride styrene copolymers. One of the most significant classes of synthetic thickeners available today are comprised of urethane polymers. More specifically, these polymers contain hydrophobic moieties attached to a polyethylene oxide backbone. The various polymeric chains are linked together via urethane linkages. This class of thickeners is often referred to as HEUR modifiers, which stands for "hydrophobically modified ethylene oxide urethane". The hydrophobic groups are positioned on the ends of the polymeric chain and together contain at least 20 carbon atoms. Since each end of the polymer chain contains a hydrophobic group, these modifiers are referred to as "diphobes". The polymeric backbone is comprised of hydrophilic polyether segments. Such HEUR modifiers are described in detail in U.S. Pat. Nos. 4,079,028 and 4,426,485.

The HEUR thickeners are referred to as "associative thickeners" because the mechanism by which they thicken involves forming hydrophobic associations between the hydrophobic moieties in the thickener molecules and other hydrophobic surfaces, including other thickener molecules, pigments or latex particles. It is this interaction with latex particles that is the focus of this invention.

Certain formulations containing HEUR modifiers may cause bridging between the latex particles, which, in turn, leads to flocculation or "syneresis" of the aqueous latex system. Syneresis is the separation of a liquid from a gel, and manifests itself as an exudation or "squeezing out" of diluent from a separate phase. Obviously, such separation is unacceptable when found in aqueous latex paint formulations. However, attempting to solve this problem by removing or reducing the amount of HEUR modifiers results in an unacceptable drop in the viscosity of the formulation. Specifically, an unacceptable drop in mid-shear (Krebs-Stormer) viscosity results, measured as a drop in KU, or "Krebs Units".

The present invention solves the problem of syneresis in aqueous latex formulations. Surprisingly, the method of the present invention also results in an increase in the KU efficiency. KU efficiency is defined herein as a measure of the amount of thickener required to achieve a target viscosity. That is, the greater the amount of thickener required to reach a specified viscosity, the lower the KU efficiency. Achieving greater KU efficiency while, at the same time, reducing or eliminating syneresis often involves employing solutions from two diametrically opposed process parameters. To achieve both objectives through a single process step is both surprising and contra-indicated based on the known art.

STATEMENT OF THE INVENTION

The invention is directed toward a method of reducing syneresis and increasing the viscosity efficiency in aqueous compositions which contains urethane based, or "HEUR", thickeners by adding to the composition a high molecular weight monophobe or a monophobe in combination with a multiphobe. The monophobe contains at least one hydrophilic segment and only one hydrophobic segment. The hydrophobe segment will ideally have a carbon content of more than 12, and preferably in the range of 12 to 18. The monophobes of the invention may be nonionic, anionic, cationic or amphoteric. The Mn (number average molecular weight) of the monophobe hydrophilic segment is at least 2,000, and preferably greater than 5,000, up to 10,000.

The monophobe may optionally contain multiphobe molecules of various chain lengths or molecular weights. A multiphobe is a molecule containing at least one hydrophilic segment and at least two hydrophobic segments. The multiphobe is preferably a diphobe (2 hydrophobic segments). The Mn of the diphobe hydrophilic segment is less than twice the Mn of the monophobe. The hydrophobicity of the diphobe hydrophobic segment is sufficient to form non-specific hydrophobic associations. Preferably, the diphobe hydrophobic segments each contain a hydrocarbon moiety having at least 8 carbon atoms or its equivalent.

In order to achieve the dual objectives of increasing the viscosity efficiency and reducing syneresis, it has been discovered that the multiphobe may be combined with the monophobe. Up to 66% of the total weight of the monophobe plus multiphobe may be multiphobe. If multiphobe is added in excess of this amount, the KU efficiency increases but syneresis is very likely to result.

The monophobe or monophobe-multiphobe mixtures of the invention are added to the aqueous composition as a function of the amount of HEUR thickener present therein. The mixtures of the invention are added in an amount of at least 1% by weight of the HEUR thickener. Preferably, this amount is 2–50% and most preferably, 10–30%.

EXAMPLES

Various formulations of paint were prepared to verify the beneficial effects provided by the present invention. A standard pigmentless paint was prepared as follows.

| MATERIAL | AMOUNT (% by volume) |
|---|---|
| Tamol 681 | 4.13 |
| Nuosept 95 (Creanova, Inc.) | 0.22 |
| Foamaster AP (Henkel Corp.) | 0.55 |
| Propylene Glycol | 4.34 |
| Aqueous Ammonia | 0.14 |
| Texanol (Texaco Corp.) | 5.54 |
| Triton GR-7M | 0.25 |
| Rhoplex HG-74P (Rohm and Haas) | 82.67 |
| Water | 2.17 |
|  | 100% |

The HEUR rheology modifier, RM2020NPR, available from the Rohm and Haas Company, Philadelphia, Pa., was also used.

Preparation of diphobe:

hydrophilic segment=pEO (average Mn=~8,600)

hydrophobic segment=C18 moiety

Four hundred fifty grams of toluene and 258 g (0.03 moles) of poly(ethylene glycol) (average Mn of ~8,600) were charged to a flask, then stirred and heated to azeotropically remove residual water via a Dean Stark trap. The kettle temperature was reduced to 90° C., and 17.73 g (0.06 moles) of octadecyl isocyanate was added, followed by 0.2 g of dibutyltin dilaurate catalyst. After stirring at 90° C. for 1 hour, the reaction was complete.

Preparation of monophobe:

hydrophilic segment=pEO (average Mn=~10,000)

Three hundred grams of toluene and 300 g (0.03 moles) of poly(ethylene glycol) monomethyl ether (average Mn=~10,000) were charged to a flask, then stirred and heated to azeotropically remove water via a Dean Stark trap. The kettle temperature was reduced to 90° C., and 8.02 g (0.03 moles) of hexadecyl isocyanate was added, followed by 0.2 g of dibutyltin dilaurate catalyst. After stirring at 90° C. for 1 hour, the reaction was complete.

The results of adding 20% aqueous solutions of the monophobe and/or diphobe to 150 grams of the pigmentless paint are shown in Table 1.

TABLE 1

| Experiment Number | RM2020 | monophobe | diphobe | KU | Syneresis Inhibited? |
|---|---|---|---|---|---|
| Standard | 5 g | 0 g | 0 g | 93 | No |
| Control | 6.5 g | 0 g | 0 g | 100 | No |
| 1 | 5 g | 1.5 g | 0 g | 102 | Yes |
| 2 | 5 g | 0 g | 1.5 g | >144 | No* |
| 3 | 5 g | 1.2 g | 0.3 g | 114 | Yes |
| 4 | 5 g | 1.0 g | 0.5 g | 120 | Yes |
| 5 | 5 g | 0.75 g | 0.75 g | 135 | Yes |
| 6 | 5 g | 0.5 g | 1.0 g | >144 | Yes |
| 7 | 5 g | 0.3 g | 1.2 g | >144 | No |
| Comparative | 5 g | 1.5 g@ | 0 g | 82 | No |

*Syneresis was worse than expected
@commercial surfactant Triton X-405 (octyl phenol hydrophobe and @1800 Mw polyethylene oxide polymer backbone)

The use of a common surfactant in the Comparative Example reflects the well recognized practice of using such materials to counteract the undesired effects of syneresis. It is apparent from the above results that the use of the surfactant, in the same amount as the monophobe, significantly lowered thickener efficiency (lower KU) and also failed to inhibit syneresis. However, since the monophobe and Triton X-405 are regarded as nonionic surfactants, it is surprising, in view of the failure of the commercial surfactant, that the monophobe would both increase thickener efficiency and inhibit syneresis.

We claim:

1. In an aqueous composition containing thickeners, a method of reducing syneresis and increasing the viscosity efficiency in said composition comprising adding to said composition a high molecular weight monophobe, said monophobe comprising at least one hydrophilic segment and only one hydrophobic segment.

2. The method of claim 1 wherein the thickeners are hydrophobically modified ethylene oxide based urethane rheology modifiers.

3. The method of claim 1 wherein the number average molecular weight (Mn) of the monophobe hydrophilic segment is at least 2,000.

4. The method of claim 3 wherein the Mn of the monophobe hydrophilic segment is 5,000 to 10,000.

5. The method of claim 1 further comprising a multiphobe.

6. The method of claim 5 wherein the multiphobe is a diphobe.

7. The method of claim 6 wherein up to 66% of the weight of the monophobe and diphobe comprises the diphobe.

8. The method of claim 7, wherein the Mn of the diphobe hydrophilic segment is Less than twice the Mn of the monophobe hydrophilic segment.

9. The method of claim 1 wherein the viscosity efficiency is defined by an increase in KU units.

10. The method of claim 1 wherein the composition contains a latex polymer.

* * * * *